United States Patent [19]

Kuntz

[11] 3,959,225

[45] May 25, 1976

[54] THERMALLY-STAGED POLYMER PROCESS

[75] Inventor: Irving Kuntz, Linden, N.J.

[73] Assignee: Exxon Research and Engineering Company, Linden, N.J.

[22] Filed: Mar. 13, 1975

[21] Appl. No.: 558,125

Related U.S. Application Data

[63] Continuation-in-part of Ser. No. 452,969, March 20, 1974.

[52] U.S. Cl. .......... 260/63 R; 526/73; 526/86; 526/95; 526/237; 526/291; 526/292; 526/297; 526/303; 526/308; 526/335; 526/338; 526/227; 526/235; 526/206

[51] Int. Cl.² .......... C08F 2/02; C08F 4/14; C08F 210/00; C08F 212/00

[58] Field of Search ...... 260/86.7, 85.5 R, 85.5 HC, 260/88.1 R, 63 R

[56] References Cited

UNITED STATES PATENTS

| | | | |
|---|---|---|---|
| 3,174,959 | 3/1965 | Ferington | 260/86.7 |
| 3,183,217 | 5/1965 | Serniuk et al. | 260/86.7 |
| 3,278,503 | 10/1966 | Serniuk et al. | 260/86.7 |
| 3,647,753 | 3/1972 | Nakaguchi et al. | 260/86.7 |
| 3,700,648 | 10/1972 | Hirooka et al. | 260/86.7 |
| 3,790,539 | 2/1974 | Onishi et al. | 260/80.7 |
| 3,793,262 | 2/1974 | Logothetis | 260/86.7 |

*Primary Examiner*—Alan Holler
*Attorney, Agent, or Firm*—Henry E. Naylor

[57] ABSTRACT

A thermally-staged process for preparing polymers, particularly alternating interpolymers of one or more polar monomers and one or more mono or polyolefins which comprises: (1) reacting, in a first stage, a polar monomer-Lewis Acid complex with an olefin in the presence of an active oxygen compound at a temperature of about −100°C to about 0°C for a time sufficient enough to allow for conversion of up to 50% of the polar monomer to interpolymer; (2) raising the temperature of the reaction mixture, in a second stage, to about 0° to about 100°C; (3) maintaining the reaction mixture at about 0° to about 100°C for a time sufficient to optimize the yield of interpolymer; and (4) recovering the interpolymer from the reaction mixture.

Polymers prepared by the temperature-staged process of this invention possess substantially higher molecular weights than the same polymers made by prior art processes. The polymers are useful as vulcanizable elastomers, thermoplastics and lubricating oil additives.

9 Claims, 1 Drawing Figure

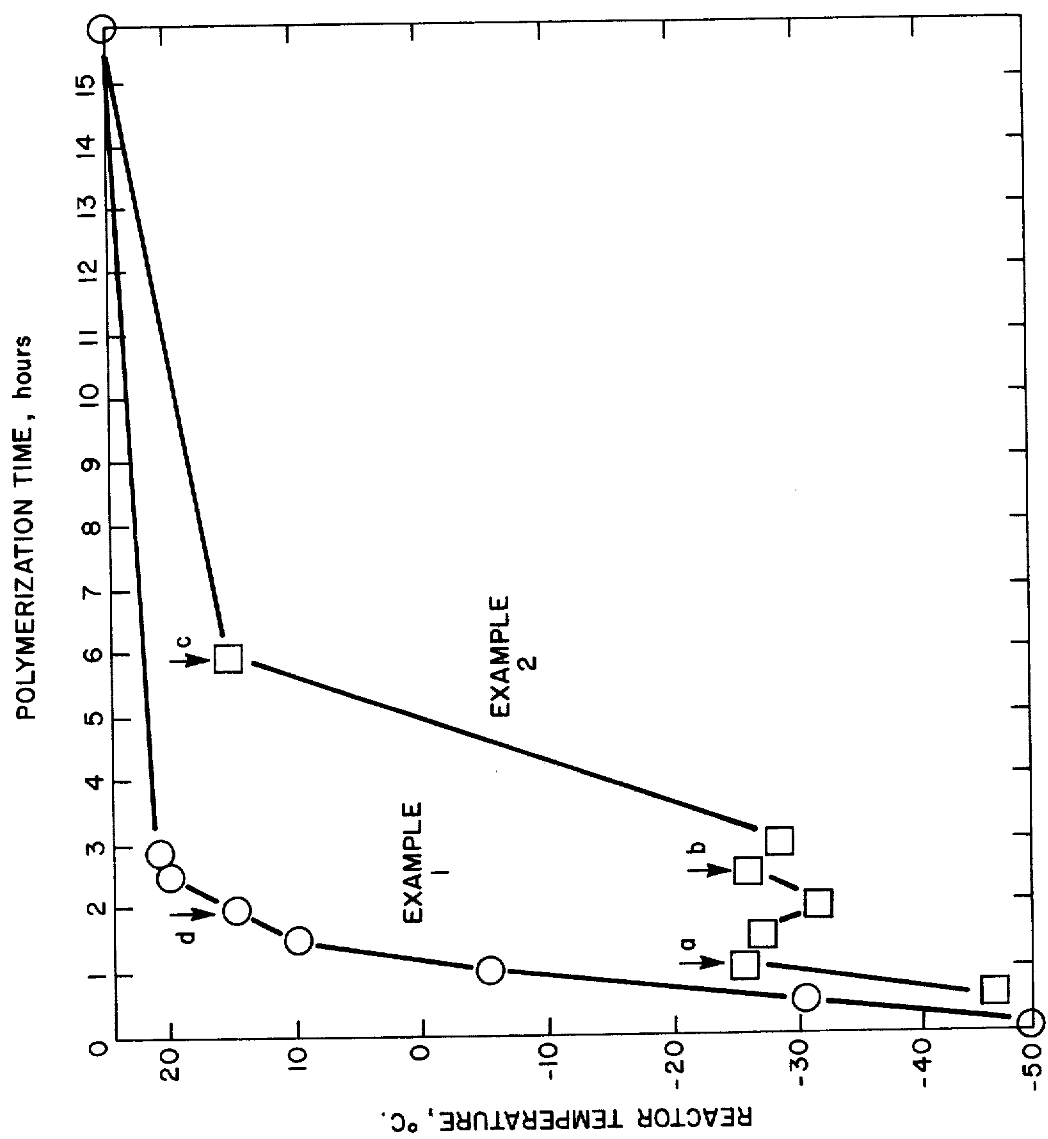
POLYMERIZATION TIME, hours
REACTOR TEMPERATURE, °C.
EXAMPLE 1
EXAMPLE 2
a
b
c
d
0 1 2 3 4 5 6 7 8 9 10 11 12 13 14 15
20 10 0 -10 -20 -30 -40 -50

THERMALLY-STAGED POLYMER PROCESS

CROSS REFERENCE TO RELATED APPLICATION

This is a Continuation-in-Part of U.S. Pat. Application Ser. No. 452,969, filed Mar. 20, 1974.

BACKGROUND OF THE INVENTION

1. Field of the Invention

This invention relates to interpolymers of monomers comprising a major amount of: (a) one or more polar monomers such as an alkyl acrylate and (b) one or more olefins such as propylene. Optionally, the interpolymers of this invention may incorporate in the macromolecule a minor proportion of (c) one or more acyclic or alicyclic conjugated or nonconjugated diolefins such as butadiene or dicyclopentadiene. More particularly, this invention relates to interpolymers of said monomers prepared with a catalyst system comprising a Lewis acid, an organic peroxide and optionally, a vanadium compound. Most particularly, this invention relates to a process for the preparation of interpolymers of said monomers with the aid of said catalysts wherein the polar monomer is complexed with the Lewis acid in a first stage at a "low temperature" in the range of ~ −100°C to ~0°C; or, if complexed at a higher temperature with said Lewis acid, it is cooled to the "low temperature", admixed at said low temperature with the olefinic monomers and remainder of the components comprising the catalyst system and maintained at said low temperature for a time sufficient to convert not less than about 10 percent nor more than about 50 percent of the polar monomer originally fed to the reaction mixture to interpolymer; thereafter raising the temperature of the reaction mixture to a "higher temperature" in the range of ~0°C to ~100°C, maintaining said reaction mixture at said "higher temperature" for a time sufficient to optimize conversion of the remainder of the monomers to interpolymers and recovering said interpolymers from the reaction mixture.

Polymers prepared in accordance with this invention have high molecular weights as evidenced by inherent viscosities in the range of ~0.5 to ~6.0 when measured in benzene at 25°C at a concentration of 0.1 G/DL, and depending on the starting monomers are useful in varying applications.

Interpolymers prepared for example from a $C_1$ to $C_6$ alkyl acrylate such as ethyl acrylate, a $C_2$ to $C_8$ monoolefin such as isobutene and up to ~10 mole percent of a diolefin such as butadiene yield elastomeric interpolymers which when vulcanized with sulfur or sulfur compounds exhibit high modulus, good tensile strength and resistance to oil, solvents and heat aging. Polymers made for example from acrylonitrile, styrene and butadiene or from methyl methacrylate and styrene yield thermoplastic resins; and polymers made from higher, preferably straight or branched chain, alkyl acrylates and higher, preferably straight chain, alpha olefins have good oil solubility and act as oil thickeners, viscosity index improvers and sludge dispersants when incorporated in lubricating oil compositions.

2. Description of the Prior Art

Since the original work in the laboratories on the preparation of alternating interpolymers of polar monomers and olefinic monomers using Lewis Acid — peroxide catalyst systems disclosed in U.S. Pat. Nos. 3,183,217; 3,278,503; and 3,426,005. There has been extensive work published in both the patent and technical literature. See for example the discussion on prior art in the parent application above referred to and in my copending U.S. Patent Application Ser. No. 459,865 (filed Apr. 11, 1974), which is herein incorporated by reference. See also Abstract 49, by N. G. Gaylord, 163rd ACS Meeting, Boston, Apr. 1972.

SUMMARY OF THE INVENTION

In distinction to the prior art for the preparation of interpolymers of polar and olefinic monomers wherein the monomers and catalyst are mixed at a lower temperature and the temperature of the reaction mixture allowed to either rise spontaneously, or is raised immediately after initial reaction to a higher temperature and maintained at the higher temperature until the reaction is completed, applicant has now found that higher molecular weight interpolymers may be prepared, compared to the same interpolymers made by prior art processes, if the reaction mixture is maintained in a first stage at the lower temperature, specifically in the range of ~−100°C to ~0°C for a time sufficient to convert at least 10 percent but not more than about 50 percent of the polar monomer originally present in the reaction mixture to interpolymer; thereafter raising the temperature in a second stage to a higher temperature; specifically in the range of ~0°C to ~100°C, maintaining the reaction mixture for a time sufficient to optimize the yield of desired interpolymer and thereafter recovering the interpolymer from the reaction mixture.

While the process of the instant invention is particularly suitable for the preparation of alternating interpolymers in which the polymer backbone consists of sequences of alternating polar and olefinic monomer units, and the sum of the polar monomers and the sum of the olefinic monomers in the interpolymer are each equal to about 50 mole percent, the instant process may also be used to prepare interpolymers in which the polar monomer in the interpolymer may be as low as ~30 mole percent or as high as ~70 mole percent. These latter interpolymers have in general some random distribution of monomer units in the polymer backbone chain but have been shown by means of Nuclear Magnetic Resonance (NMR) analysis to contain segments having a true alternating polymer structure.

DESCRIPTION OF PREFERRED EMBODIMENTS

I. Monomers

A. Olefins

Monoolefins suitable for the practice of this invention include $C_2$ to $C_{20}$ hydrocarbons and halohydrocarbons which may be Type I olefins and haloolefins having the general formula R—CH═CH$_2$ and Type III olefins and haloolefins having the general formula

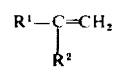

where R, R$^1$ and R$^2$ are independently selected from the group consisting of halogen; hydrogen; straight and branched-chain alkyl radicals; aryl; alkylaryl; aralkyl and cycloalkyl radicals having from 1 to 18 carbon atoms and halo substituted derivatives of said radicals. Vinyl ethers and their halogenated derivatives are included in this group.

Non-limiting examples of suitable Type I olefins, haloolefins and their derivatives include: ethylene; propylene; 1-butene; 1-pentene; 1-hexene; 4-methyl-1-pentene; 1-heptene; 4,4-dimethyl-1-pentene; 1-octene; 1-nonene; 1-decene; 3,7-dimethyl-1-octene; 1-dodecene; 1-tridecene; 1-tetradecene; 1-octadecene; styrene; 4-methyl styrene; vinyl cyclohexane; 2-vinyl norbornane; vinyl naphthalene; vinyl chloride; allyl chloride; 4-chloro-1-butene; 4-chlorostyrene; 4-chlorovinyl cyclohexane; 4-chloroallyl benzene, 2-chloroethyl vinyl ether and methyl vinyl ether.

Non-limiting examples of suitable Type III olefins and haloolefins include: isobutylene; 2,3-dimethyl-1-butene; 2,4,4-trimethyl-1-pentene; 2,6-dimethyl-1-octene; 4-isopropenyl toluene; isopropenyl cyclohexane; α-methylstyrene; α-chlorostyrene; 4-chloro-α-methylstyrene; and vinylidene chloride.

The general formulae used to illustrate the types of olefins suitable for the practice of this invention are based on the Boord Classification described by Schmidt and Boord in J.A.C.S. 54, 751 (1932).

B. Polar Monomers

Polar monomers suitable for the practice of this invention may be represented by the general formula:

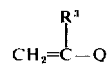

wherein $R^3$ is independently selected from the group consisting of hydrogen, methyl and halo radicals; and Q is a polar group selected from the group consisting of: cyano (—CN); carboxy (—COOH); carboalkoxy (—$COOR^4$) wherein $R^4$ is selected from the group consisting of $C_1$ to $C_{18}$ straight and branched chain alkyl radicals, arylalkyl radicals and cycloalkyl radicals and olefinic or halogen substituted derivatives thereof; acyl radicals (—$COR^5$); amide (—$CONH_2$); and formyl (—CHO) radicals, and $R^5$ is selected from the group consisting of $C_1$ to $C_{18}$ alkyl, aryl, alkylaryl, arylalkyl and cycloalkyl radicals, and halogen substituted derivatives thereof.

Nonlimiting examples include: acrylonitrile, acrylic acid, methyl acrylate, methyl methacrylate, cyclohexyl acrylate, dodecyl acrylate, tetradecyl acrylate, benzyl acrylate, β-chloroethyl acrylate, vinyl ethyl ketone, and acrylamide.

C. Diolefins

Diolefins which may be interpolymerized with the monoolefins and polar monomers may be acyclic or alicyclic conjugated or nonconjugated diolefins. Nonlimiting examples of conjugated diolefins include: 1,3-butadiene; isoprene, cis and trans piperylene; 1,3-hexadiene; 2,3-dimethyl-1,3-butadiene; 3,7-dimethyl-1,3-octadiene; and 3-(4-methylpentyl)-1,3-butadiene. Nonlimiting examples of nonconjugated dienes include: 1,4-hexadiene; 1,6-octadiene; 5-methyl-1,4-hexadiene; 3,7-dimethyl 1,6-octadiene; dihydromyrcene, dihydroocimine; 1,4-cyclohexadiene, 1,5-cyclooctadiene; 4-vinyl cyclohexene; 1-allyl-4-isopropylidene cyclohexane; 3-allylcyclopentene; 1-isopropenyl-4-(4-butenyl) cyclohexane; dicyclopentadiene; bicyclo (2,2,1) hepta-2,5-diene; and 5-ethylidene norbornene.

II. Catalysts

Catalyst compositions suitable for the practice of this invention comprise in combination a Lewis Acid and an active oxygen compound. Optionally, a vanadium compound may be used with the Lewis Acid as a cocatalyst. While a variety of Lewis Acids may be used such as aluminum halides and boron trifluoride, preferred are organoaluminum halides having the general formula Al $R_mX_n$ wherein R is a monovalent hydrocarbon radical selected from the group consisting of $C_1$ to $C_{12}$ alkyl, aryl, alkylaryl, arylalkyl and cycloalkyl radicals, m is a number from 1 to 3, X is a halogen selected from the group consisting of chlorine, bromine and iodine and the sum of $m$ and $n$ is equal to three. Nonlimiting examples of useful organoaluminum halides include $Et_2AlCl$, $EtAlCl_2$, $Et_{1.5}AlCl_{1.5}$ used either alone or in admixture with one another.

Useful vanadium compounds have the general formula $VO_zX_t$ wherein $z$ has a value of zero or one; $t$ has a value of two to four; and X is independently selected from the group consisting of chlorine, bromine, iodine, acetylacetonates, haloacetylacetonate, alkoxides and haloalkoxides. Nonlimiting examples include $VCl_4$; $VOCl_3$; $VO(OEt)_3$; $VOCl_2(OBu)$; $V(AcAc)_3$; $VO(AcAc)_2$; and $VOCl_2(AcAc)$ where (AcAc) is an acetylacetonate unit.

Active oxygen compounds suitable for use in this invention include oxygen, ozone, organic peroxides, hydroperoxides, peracids, and peroxyesters. Nonlimiting examples include benzoyl peroxide; lauroyl peroxide; acetyl peroxide, t-butyl peroxide, t-butyl peracetate; t-butyl peroxy pivalate; cumene hydroperoxide; dicumyl peroxide; and 2-methyl pentanoyl peroxide.

The concentration of the individual catalyst components may be varied over a wide range depending on the reactivity of the individual monomers. Suitable mol ratios of polar monomer per mol of organoaluminum compound may range from 1 to ~2000 or higher. Preferred is a ratio of from ~5 to ~1500. Most preferred is a ratio of from about ~10 to ~1000 mols of polar monomer per mol of organoaluminum halide compound.

The molar ratio of the organoaluminum compound to the vanadium compound when used as a cocatalyst may also be varied over a wide range. Usable molar ratios are from ~1 to ~100 mols of organoaluminum compound per mol of vanadium compound. Preferred is a range of from about 2 to ~50. Most preferred is a molar ratio of from 3 to about 30 mols of organoaluminum compound per mol of vanadium compound.

The peroxide component is similarly variable over a wide range of mol ratios. Suitable ratios range from ~10 to ~2000 mols of polar monomer per mol of peroxide. Preferred is a ratio of from about 20 to ~1000. Most preferred is a ratio of from ~30 to ~500 mols of polar monomer per mol of peroxide.

III. Solvents

Suitable media for dissolving or dispersing the catalyst components and polymeric reaction products include the general group of aliphatic and aromatic hydrocarbons and halogenated hydrocarbons. Acyclic $C_8$ or lower straight or branched chain saturated hydrocarbons may be used with certain olefins and polar monomers but $C_5$ to $C_9$ saturated alicyclic or $C_6$ to $C_9$ aromatic hydrocarbons are preferred. Halogenated hydrocarbons having from one to six carbon atoms are also useful. Choice of a particular solvent or mixture of solvents will depend on the process conditions, e.g. whether a homogeneous solution process, suspension or slurry process or cement suspension process is used.

In a homogeneous solution process for the production of a high molecular weight interpolymer, the concentration of polymer in the cement is usually limited to a range of ~5 to ~10 weight percent since higher concentrations are difficult to mix, efficient heat exchange is difficult to achieve and the high viscosity of the solution causes sticking and fouling of the reactor and transfer lines.

In a slurry process in which the monomers and catalyst components are soluble in the solvent but in which the polymer is not, higher concentrations of polymer in the range of ~10 to ~20 wt. percent may be attained. Similar concentrations may be attained in a cement suspension process in which a mixture of solvents is chosen which yields two phases; a cement phase of polymer swollen with monomers and solvent dispersed in a continuous second phase of essentially pure solvent containing a small amount of monomers. Any of the above solvent systems may be used in batch, semicontinuous or fully continuous processes.

Nonlimiting examples of suitable solvents include: butane; pentane; cyclopentane; hexane; heptane; isooctane; benzene; cyclohexane; toluene; mixed xylenes; cumene; methylene chloride; dichloroethane; orthodichlorobenzene and fluorinated or chlorofluorinated $C_2$ to $C_4$ acyclic hydrocarbons. Solvents which are known to form stable complexes with any of the catalyst components, particularly the Lewis Acid or the vanadium compound are undesirable and should be avoided.

IV. Process Conditions

The interpolymers of this invention may be prepared in two-stage batch, semicontinuous or fully continuous processes in which homogeneous solution, slurry, or cement suspension systems are utilized. In a typical batch process, a single reactor fitted with efficient agitation means, and means for heat exchange, is purged of air by displacement with oxygen-free nitrogen, argon or low boiling saturated hydrocarbon vapors such as methane, ethane or propane and charged with a solvent or mixture of solvents. In the process of the instant invention, the polar monomer or mixtures thereof, most often diluted in a suitable solvent, is complexed with a Lewis Acid. The complex may be formed in various ways. It may be prepared at a temperature above 0°C and then cooled to the low temperature, (−100° to 0°C) or, it may be formed at the low temperature before the addition of the other monomers and catalyst components which comprise the polymerizing system. In a batch process, the complex may be prepared in the reactor; in continuous processes, the complex may be prepared by mixing in the line feeding the reactor. Pressure during the time the mixture is undergoing reaction to form polymer is maintained at a level to keep the reactants in the liquid phase.

After formation of the Lewis Acid polymer monomer complex and the addition of the remainder of the reactants and catalyst components, the reaction mixture is maintained at a low temperature, e.g. −100° to 0°C in the first stage for a time sufficient to convert at least 10 percent of the polar monomer, but not more than 50 percent of the polar monomer fed to the reaction mixture into interpolymer. The temperature of the reaction mixture is then allowed to rise spontaneously or by the application of heat in a second stage, using the same reactor in the case of a batch process, or a second reactor or mixing drum in the case of a continuous process, and is then maintained at a higher temperature in the range of ~0° to ~100°C for a time sufficient to optimize the yield of polymer having the desired molecular weight.

The time during which the reaction mixture is maintained at the low temperature in the first stage and the higher temperature in the second stage will vary widely depending on the reactivities of the particular monomers, catalyst composition and concentration, initial concentration of the monomers in the reaction mixture and the temperatures that are maintained in the two stages. In general, reaction times in both stages will be shorter at higher monomer, and catalyst concentrations and at higher polymerization temperatures. Accordingly, polymerization times in the first stage may vary from as little as 0.10 hour to 10 hours. Time in the second stage may vary for example from ~0.20 to ~60 hours. Preferred are total reaction times for the two stages in the range ~ of 0.3 to ~24 hours.

Isolation of the interpolymer at the completion of the reaction may be accomplished in a variety of ways. In a preferred embodiment, the homogeneous polymer cement solution, or polymer suspension, or polymer cement suspension is fed from the reactor in the case of a batch process, or final reactor or holding drum in the case of a semicontinuous or fully continuous process to a mixing drum where the reaction mixture is mixed either in line or is mixed in the drum with a quantity of a lower alcohol such as methanol, ethanol or isopropanol in order to inactivate the catalyst mixture. The alcohol may optionally contain a deashing or sequestering reagent such as an acid, base, ethylene diamine tetra acetic acid or its disodium salt or acetylacetone. While inactivation of the catalyst in the manner indicated is preferred it is not essential and may be omitted if desired.

The polymer solution or suspension, with or without catalyst inactivation is fed to an agitated wash drum where it is mixed with a dilute aqueous solution of an acid such as hydrochloric or sulfuric acid in order to deash the polymer. Acid treatment followed by thorough water washing under efficient agitation is repeated if necessary so as to obtain a polymer with a minimal ash content. Deashing can also be accomplished under basic conditions.

Final isolation of the polymer in crumb form is accomplished by feeding the polymer solution or suspension to a slurry flash drum where it is treated with steam and hot water to precipitate the polymer and vaporize the solvent. Typically, antioxidants, stabilizers and slurry aids are added to the polymer solution or suspension before slurrying and removal of solvent. The water slurry of polymer is finally fed to dewatering and drying extruders before packaging in bale or crumb form. Solvent and unreacted monomers, vaporized in the slurry flash drums are purified and recycled to the polymerization reactors if desired.

In the case of interpolymers which have been prepared from substantially straight-chain $C_{12}$ to $C_{20}$ alpha-olefins or from substantially straight-chain $C_{12}$ to $C_{20}$ alkyl acrylates, or both, the deashed solution or suspension of the interpolymer intended for use as a dispersant or viscosity-index improver may be mixed with a solvent extracted, low-pour neutral oil and a solution of the polymer in the oil obtained by solvent exchange. Concentrates prepared in this manner may be compounded with other additives such as antioxidants, pour depressants, oiliness agents and the like.

The preparation of the interpolymers of this invention and the advance over the prior art is more clearly demonstrated in the following examples.

EXPERIMENTAL

The following example is illustrative of the preparation of a copolymer of ethyl acrylate and propylene according to the prior art.

EXAMPLE 1

A one liter autoclave equipped with a stirrer and means for cooling the contents was charged with 50 grams (0.5 mole) of ethyl acrylate dissolved in 200 ml of toluene, cooled to −30°C and the polar monomer complexed with 1.10 grams (90 m-moles) of ethyl aluminum sesquichloride $(C_2H_5)_{1.5}$ $AlCl_{1.5}$ dissolved in hexane. The solution was further cooled to −50°C and to it was added 84 grams (2.0 moles) of liquefied propylene and 2 m-moles of lauroyl peroxide. The temperature was allowed to rise spontaneously over the next 3 hours to 22°C and the reaction continued for a total time of 16 hours. A sample taken at the end of 2 hours indicated on the curve by d showed that 68 percent of the ethyl acrylate had been converted to copolymer. The curve indexed by circles in FIG. 1 shows the thermal history of the reaction mixture of this example. The polymer was isolated and the reaction terminated by addition of the reaction mixture to a large volume of rapidly agitated isopropyl alcohol. The polymer after drying to constant weight at 80°C under vacuum was found to have an inherent viscosity of 0.51 when determined at 25°C in benzene at a concentration of 0.1 G/DL.

The following example is illustrative of the preparation of the same copolymer of Example 1 using the process of this invention.

EXAMPLE 2

This example was identical to Example 1 up to and including addition of the lauroyl peroxide except that the temperature of the reaction mixture was maintained over the next three hours between −33°C and −25°C. The curve indexed by squares in FIG. 1 shows the thermal history of this example. Analyses on samples taken from the reaction mixture at the end of 1 hour and 2.5 hours reaction time indicated respectively by a and b showed conversion of the ethyl acrylate to copolymer to have occurred to the extent of 25 percent at the end of one hour and 30 percent at the end of 2.5 hours. The temperature of the reaction mixture was allowed to rise spontaneously over the next 3 hours, indicated by square C, to 15°C at which time a sample showed conversion of the ethyl acrylate to copolymer to have occurred to the extent of 67 percent. After a total reaction time of 16 hours the copolymer was isolated as in Example 1 and showed an inherent viscosity of 1.2 when determined in benzene at 25°C at a concentration of 0.1 G/DL.

The yield of copolymer obtained in both Examples 1 and 2 was the same and examination of both samples by NMR at 60 MHZ in $C_6D_6$ solution indicated that both samples contained 50 mole percent of ethyl acrylate.

A comparison of the inherent viscosities of these polymers with number average ($\overline{M}_n$) molecular weights of similar copolymers obtained by measurement with the Shell-Stabin Membrane Osmometer indicates a relationship of an $\overline{M}_n$ of ~ (about) 120,000 to about 140,000 for an $n_{INH}$ (inherent viscosity) of about 1.1 to about 1.2.

EXAMPLE 3

Using the equipment of Example 1, and the process of this invention illustrated in Example 2, the autoclave was charged at −50°C with 200 ml of toluene, 0.5 moles of ethyl acrylate and 0.05 moles of 2-chloroethyl acrylate. The mixture of polar monomers was complexed with 90 m-moles of ethyl aluminum sesquichloride and while maintaining the temperature at −50°C, 2.1 moles of propylene and 2.0 m-moles of lauroyl peroxide were added to the reaction mixture. The temperature profile was adjusted to be similar to (but not identical) to that of Example 2. A 97 percent yield of terpolymer was obtained containing 11 mole percent of 2-chloroethyl acrylate, with an inherent viscosity of 1.0 when measured in benzene at 25°C at a concentration of 0.1 G/DL. The terpolymer is crosslinked with a nucleophilic reagent such as a diamine to give a useful elastomeric product.

Having described my invention and preferred embodiments thereof I claim:

1. A process for the preporation of interpolymers from monomers comprising one or more polar monomers; one or more monoolefins having the general formula

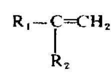

$$R_1-\underset{\displaystyle R_2}{\underset{|}{C}}=CH_2$$

wherein $R_1$ and $R_2$ are independently selected from the group consisting of halogen; hydrogen; straight and branched chain alkyl radicals; aryl; alkylaryl; aralkyl and cycloalkyl radicals having from 1 to 18 carbon atoms and halo substituted derivatives thereof; and optionally one or more acyclic or alicyclic conjugated or nonconjugated diolefins which comprises:

a. mixing a Lewis Acid and said polar monomer at a temperature in the range of −100°C to 0°C to form a Lewis Acid polar monomer complex;

b. mixing said complex with said olefin monomer and an active oxygen compound at said temperature to form a reaction mixture;

c. maintaining said reaction mixture at said temperature in a first stage for a time sufficient to convert at least 10 percent but not more than 50 percent of said polar monomer in said reaction mixture to said interpolymer;

d. thereafter raising the temperature of said reaction mixture to a higher temperature in the range of 0° to 100°C;

e. maintaining said reaction mixture at said higher temperature in a second stage for a time period of about 0.2 to 60 hours; and f. recovering said interpolymer from said reaction mixture.

2. Process according to claim 1 wherein a vanadium compound cocatalyst is added to said reaction mixture at said low temperature.

3. Process according to claim 1 wherein said Lewis Acid is selected from the group consisting of aluminum halides, boron trifluoride and organoaluminum halides having the general formula $R_mAlX_n$ wherein R is a monovalent hydrocarbon radical selected from the group consisting of $C_1$ to $C_{12}$ alkyl, aryl, alkylaryl, arylalkyl and cycloalkyl radicals, m is a number from 1 to 3, X is a halogen selected from the group consisting of chlorine, bromine and iodine and the sum of *m* and *n* is three.

4. Process according to claim 1 wherein said polar monomers are compounds having the general formula $CH_2{=}C(R^3){-}Q$ wherein $R^3$ is independently selected from the group consisting of hydrogen, methyl and halo radicals and Q is selected from the group consisting of cyano, carboxy, carboalkoxy, acyl, amide, and formyl radicals.

5. Process according to claim 1 wherein said active oxygen compound is selected from the group consisting of oxygen, ozone, organic peroxides, hydroperoxides, peracids and peroxyesters.

6. Process according to claim 2 wherein said vanadium compound has the general formula $VO_zX_t$ wherein z has a numerical value of 0 or 1; t has a numerical value of 2 to 4; and X is independently selected from the group consisting of chlorine, bromine, iodine, acetylacetonates, haloacetylacetonates, alkoxides and haloalkoxides.

7. Process according to claim 4 wherein said carboalkoxy radicals have the general formula $-COOR^4$ wherein $R^4$ is selected from the group consisting of $C_1$ to $C_{18}$ straight and branched chain alkyl radicals, arylalkyl radicals, and cycloalkyl radicals and olefinic or halogen substituted derivatives thereof.

8. Process according to claim 4 wherein said acyl radicals have the general formula $-COR^5$ wherein $R^5$ is selected from the group consisting of $C_1$ to $C_{18}$ straight and branched chain alkyl, aryl, alkylaryl, arylalkyl and cycloalkyl radicals and halo substituted derivatives thereof.

9. Process according to claim 4 wherein said alkoxy radicals have the general formula $OR^5$ wherein $R^5$ is selected from the group consisting of $C_1$ to $C_{18}$ straight and branched chain alkyl, aryl, alkylaryl, aralkyl and cycloalkyl radicals and halo substituted derivatives thereof.

* * * * *